United States Patent [19]

Fischer et al.

[11] Patent Number: 4,592,055
[45] Date of Patent: May 27, 1986

[54] OUTER-LOOP MONITOR FOR AIRCRAFT AUTOMATIC FLIGHT CONTROL SYSTEM

[75] Inventors: William C. Fischer, Monroe; Stuart C. Wright, Milford; David J. Verzella, Guilford, all of Conn.

[73] Assignee: United Technologies Corporation, Hartford, Conn.

[21] Appl. No.: 490,644

[22] Filed: May 2, 1983

[51] Int. Cl.⁴ .................... G05D 1/00; G06F 11/30
[52] U.S. Cl. .................................. 371/62; 244/194; 364/434; 371/68
[58] Field of Search ............ 364/424, 434, 551; 244/194; 318/565; 371/16, 25, 68, 62

[56] References Cited

U.S. PATENT DOCUMENTS

| | | | |
|---|---|---|---|
| 3,624,479 | 11/1971 | Callas | 318/565 |
| 3,880,385 | 4/1975 | Reynolds et al. | 318/565 X |
| 3,969,664 | 7/1976 | Camillieri et al. | 318/565 |
| 4,355,358 | 10/1982 | Clelford et al. | 364/424 |
| 4,387,432 | 6/1983 | Fischer et al. | 364/434 |
| 4,417,303 | 11/1983 | Wright et al. | 364/434 |
| 4,484,283 | 11/1984 | Verzella et al. | 364/434 |

Primary Examiner—Felix D. Gruber
Attorney, Agent, or Firm—Gerald E. Linden

[57] ABSTRACT

The sense (direction) of outer-loop commands is compared with the sense (direction) of inner-loop signals in an aircraft AFCS. A disparity in sense indicates an outer-loop failure. To reduce nuisance failures the comparison is made only when inner-loop signal thresholds are exceeded and, in the context of outer-loop commands which are pulses, only at the onset of an outer-loop command and for a limited time thereafter.

1 Claim, 2 Drawing Figures

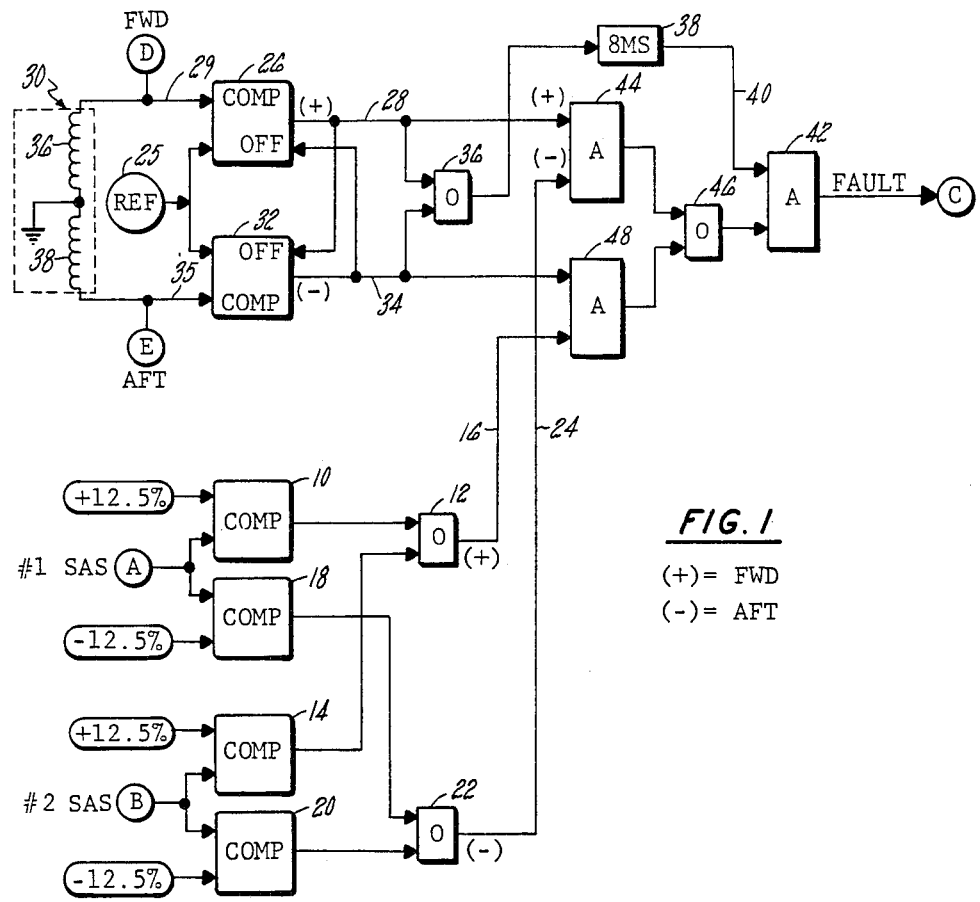
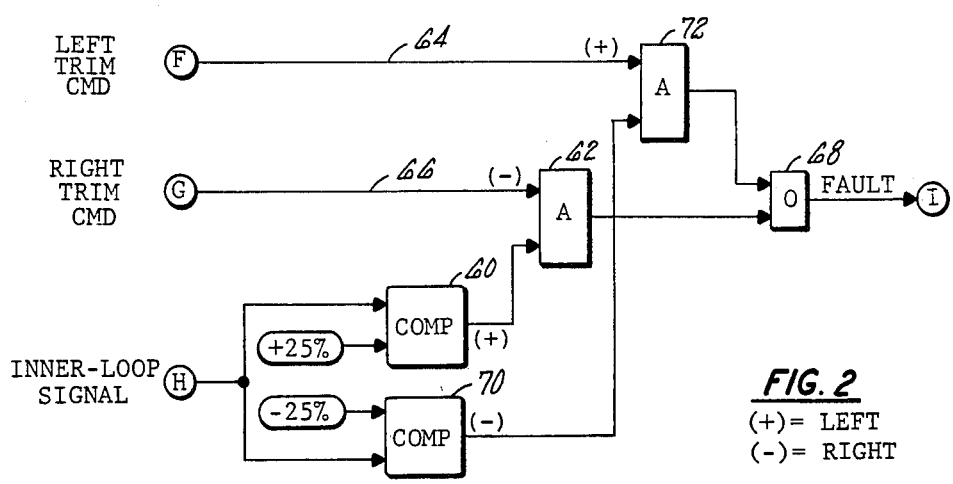
FIG. 1
(+) = FWD
(−) = AFT
FIG. 2
(+) = LEFT
(−) = RIGHT 4,592,055

OUTER-LOOP MONITOR FOR AIRCRAFT AUTOMATIC FLIGHT CONTROL SYSTEM

TECHNICAL FIELD

This invention relates to detecting differences between a plurality of signals and, more particularly, to monitoring the activity of the outer-loop in an aircraft automatic flight control system that has both inner and outer loops.

BACKGROUND ART

Many control systems operate in response to a plurality of signals. For example, an aircraft automatic flight control system (AFCS) responds to the outputs of gyros, altimeters, accelerometers, computers, actuators, etc. in order to control the maneuvering of the aircraft. Furthermore, signals may be proportional, integrated, etc. Hereinafter, signals in the context of an AFCS are discussed, but the teachings disclosed herein are applicable to other signals.

A typical AFCS includes two major sub-systems for each control axis of the aircraft (roll, pitch, yaw, lift, speed). One sub-system, the outer-loop, typically has full authority to control the particular axis involved, but is limited in the rate at which it can exercise the authority. The other sub-system, the inner-loop, typically is fast acting, but limited in authority. Both loops operate through actuators. The cumulative effects of the inner-loop, the outer-loop, and pilot inputs control the particular axis involved.

To prevent runaway loops or actuators, presently configured monitor/shut-down systems include an electronic model which requires an independent source of information. A fault is indicated and shut down of the outer-loop trim actuator is achieved when a discrepancy exceeding a pre-set threshold is identified between the model and the actuator. However, such a system merely identifies a discrepancy and disables the trim actuator, and does not allow for continued operation should a model failure be the source of the discrepancy.

Commonly owned, copending U.S. patent application No. 490,698, filed on even date herewith, entitled "Aircraft Trim Actuator Shutdown Monitor System" discloses a system wherein opposite motion of the inner-loop and outer-loop actuators causes a shutdown when certain position and rate limits are exceeded.

Commonly owned, copending U.S. Pat. No. 4,387,432, filed on Mar. 30, 1981, entitled "Pulsed Aircraft Actuator", incorporated by reference, discloses an AFCS wherein the outer-loop commands are derived from the inner-loop limited proportional error signals. The outer-loop command is nominally in the same direction (i.e., of the same sense) as the inner-loop error signal. The outer-loop trim actuator is stepped, in response to outer-loop command pulses of a certain duration provided thereto whenever the inner-loop proportional error signal is biased off center and the integral of the inner-loop signal exceeds a threshold. Therefore no position sensor is required at the trim actuator. The outer-loop function is to keep the inner-loop authority centered. Recentering of the inner-loop is achieved by subtracting from the inner-loop signal an amount equal to the outer-loop command. The outer-loop actuator is an electro-mechanical device and malfunctions can occur within the actuator or in the circuits that provide the outer-loop command pulses to it, either of which could cause an undesirable actuator runaway (hardover). Therefore, an outer-loop monitor has been provided to detect outer-loop pulses of excessive duration. Obviously, with such a monitoring scheme the amount of time required to detect a malfunction is limited, at the lower end, by the duration of a complete pulse. The inherent delay in detecting a failure is not desirable in certain flight regimes. Furthermore, a failure that provides a series of pulses, each of which is within tolerance, will not be detected, but could cause a hardover. Because of these limitations, a hazardous situation may develop before a malfunction is declared and acted upon, such as in a pitch hardover.

DISCLOSURE OF INVENTION

Therefore, it is an object of this invention to monitor and shut down an outer-loop which is commanding a trim actuator in a runaway fashion. In the context of a pulsed aircraft actuator system, it is a further object to shut down a malfunctioning outer-loop quickly, before a hazardous situation develops and in less time than a complete pulse. It is a further object to detect fail-ures, such as spurious pulse trains, which heretofore may not have indicated a failure. It is a still further object to monitor the outer-loop without a trim actuator position sensor.

According to the invention, the sense (direction) of an outer-loop command is compared to the sense (direction) of an inner-loop proportional error signal. Nominally, their senses should be the same. Therefore, when their senses are opposite, a fault is indicated. However, since the inner-loop signal may vary or change sense rapidly, in response to aircraft perturbations, the comparison is made only when the inner-loop signals equal or exceed a threshold, such as 12.5%, of inner-loop authority in either direction, thereby establishing a dead zone (window of non-comparison). To further minimize nuisance failures, while minimizing the dead zone, the comparison is made only at the onset of an outer-loop command, which is a pulse, and for a limited time thereafter—the limited time being a small fraction of a pulse.

The invention may be implemented utilizing analog or digital signal processing, apparatus and techniques which are well within the skill of the art in the light of the teachings which follow hereinafter with respect thereto. The foregoing and other objects, features and advantages of the present invention, will become more apparent in the light of the following detailed description of exemplary dedicated hardware embodiments thereof.

BRIEF DESCRIPTION OF DRAWINGS

FIG. 1 is a simplifed schematic block diagram of the outer-loop monitor of this invention for pitch axis control.

FIG. 2 is a schematic block diagram of the outer-loop monitor of this invention for roll axis control.

BEST MODE FOR CARRYING OUT THE INVENTION

In FIG. 1 is shown an outer-loop monitor for association with a pitch channel, such as has been disclosed in commonly owned, copending U.S. Pat. No. 4,387,432, entitled "Pulsed Aircraft Actuator". Cross-references to said U.S. application are made hereinafter in the following abbreviated format: (P.A.A., FIG. n: reference number xy).

With reference to the pitch outer-loop monitor of FIG. 1, a comparator 10 provides a signal to an OR circuit 12 when a limited inner-loop proportional error signal (A), such as is provided by an AFCS (P.A.A., FIG. 1:54), is commanding movement of a first pitch inner-loop actuator (P.A.A., FIG. 1:12) equal to or in excess of a percentage, such as +12.5%, of the pitch inner-loop actuator authority in the forward direction. All forward actuation is designated as positive (+) and aft actuation as negative (−) herein, since the "sense" of signals is essential to fault identification. A comparator 14 provides a signal to the OR circuit 12 when the limited inner-loop proportional error signal (B) (P.A.A., FIG. 1:55) is commanding movement of a second pitch inner-loop actuator (P.A.A., FIG. 1:13) equal to or in excess of a percentage, such as +12.5% of the pitch inner-loop authority in the forward direction. Therefore, in the context of a dual actuator system, the OR circuit 12 provides a positive signal (logic ONE) on a line 16 indicative of an inner-loop signal directing forward motion in either inner-loop actuator equal to or in excess of +12.5% of authority. Likewise, a comparator 18, a comparator 20, and an OR circuit 22 cooperate to provide a negative signal (logic ONE) on a line 24 indicative of an inner-loop signal directing aft motion in either inner-loop actuator equal to or in excess of a percentage, such as −12.5% of authority (i.e. arithmetically "less than" the negative percentage). The +12.5% to −12.5% dead zone (non-comparison window) is provided to reduce nuisance failures since the signals in the inner-loop are capable of varying rapidly, and more particularly changing sense, in response to aircraft perturbations. It should be understood that some tradeoff is made between sensitivity and reduction of nuisance failures when establishing the dead zone. The dead zone need not be symmetrical, and may be implemented otherwise depending on aircraft characteristics. In practice, the dead zone can be eliminated by comparing the inner-loop signal to a single reference. When the inner-loop signal equals or exceeds the reference, the positive signal would be provided. The negative signal would be provided when the inner-loop signal was less than the reference. A dual inner-loop actuator scheme is disclosed herein, but the teachings are applicable to single or multiple actuator schemes.

A forward outer-loop command (D) is provided on a line 29 to an actuator 30 (P.A.A., FIG. 1:37; FIG. 3:150) to cause the actuator to pitch the aircraft forward. Similarly, an aft outer-loop command (E) is provided on a line 35 to the actuator 30. In the context of the "Pulsed Aircraft Actuator", the outer-loop commands (D,E) are provided separately, as similar pulses on separate lines. Therefore, a comparator 26 provides a signal on a line 28 in response to a forward (i.e., positive) outer-loop command and a comparator 32 provides a signal on a line 34 in response to an aft (i.e., negative) outer loop-command. Again, positive and negative connote sense (direction). Since the magnitude of the outer-loop commands (D,E) is not relevant, the reference 25 merely enables the comparators 26,32 to make an existential determination of pulse presence. The provision of either pulse (e.g., D) will, through coils 36, 38 of the actuator 30, be manifested as a delayed pulse on the other line (e.g., 35). Therefore, both comparators 26, 32 are provided with inhibit (OFF) inputs, connected to each other's outputs, so that there is a signal on only one of the lines 28, 34, never both simultaneously. In the context of outer-loop commands that are not pulses, and that may not be provided separately for forward and aft, the reference 25 may establish a threshold or a dead zone, in conjunction with comparators, in a manner like that described for the inner-loop.

A signal on either of the lines 28, 34 will cause an OR circuit 36 to start an EIGHT millisecond single-shot 38. The single-shot 38 provides a signal (logic ONE) on a line 40 to an AND circuit 42 to enable the outer-loop monitor at the onset of an outer-loop pulse, as indicated by the output of the OR circuit 36, and for only a limited time (EIGHT milliseconds) thereafter. This further reduces nuisance failures when, during an outer-loop pulse, the fast-responding inner-loop signal changes sense. Because the outer-loop pulses are provided when the integral of the inner-loop proportional error signal reaches a threshold, for monitoring purposes it has been determined that a lack of correlation between the sense of the inner-loop signal and the sense of the outer-loop command, at the onset of the outer-loop command, provides a valid indication of a failure. It should be understood that the dead zone and limited time comparison cooperatively affect the ability of the monitor to detect bonafide failures and reduce nuisance failures. Therefore, it is desirable to keep the limited time comparison as short as possible, bearing in mind, however, circuit response.

The signal on the line 28, indicative of a forward (positive) outer-loop command is provided to an AND circuit 44 in conjunction with the negative signal on the line 24, indicative of an aft inner-loop signal. When both signals are present, simultaneously, a disparity in sense exists and a signal, indicative of the disparity is provided to an OR circuit 46, the output of which drives the output (C) of the AND circuit 42 to logic ONE, indicative of a fault, when the monitor is enabled by the signal on the line 40.

Similarly, the signal on the line 34, indicative of an aft (negative) outer-loop command, is provided to an AND circuit 48 in conjunction with the positive signal on the line 16, indicative of a forward inner-loop command. When both signals are present, simultaneously, a disparity in sense exists and a signal, indicative of the disparity is provided to the OR circuit 46 to indicate a fault.

The fault signal (C) may be provided to any suitable means for shutting down the outer-loop actuator, such as the Pitch Outer-Loop Automatic Shutdown (P.A.A., FIG. 1:38) of the "Pulsed Aircraft Actuator". Therein, the signal (C) easily could be "orred" into the bistable latch (P.A.A., FIG. 3:185).

In FIG. 2 is shown an outer-loop monitor for association with a roll channel, such as has been disclosed in the aforementioned U.S. Pat. No. 4,387,432. Cross-references to said application are designated as discussed hereinbefore.

In roll, a wider range of failures is permissible due to aircraft response characteristics. A comparator 60 provides a positive signal, such as logic ONE, to an AND circuit 62 when an inner-loop proportional error signal (H) is commanding movement of a roll inner-loop actuator (P.A.A., FIG. 4, R.I.L. ACTR 1) equal to or in excess of a percentage, such as +25%, of the roll inner-loop actuator authority in the left direction. Similarly, a comparator 70 provides a negative signal, such as logic ONE, to an AND circuit 72 indicative of a right inner-loop signal equal to or in excess of −25% of authority. Outer-loop commands are pulses (F,G), provided on lines 64, 66 to command the roll outer-loop actuator left and right respectively. Left is designated as positive and right as negative for sense comparison. The positive left outer-loop command is provided to the AND circuit 72 and the negative right outer-loop command is provided to the AND circuit 62. When the negative right outer-loop command is provided simultaneously with the positive signal on the line 16 from the inner-loop, the AND circuit 62 provides a signal indicative of a fault to an OR circuit 68. Similarly, when the positive left outer-loop command is provided simultaneously with the negative signal from the inner-loop, the AND circuit 72 provides a signal indicative of a fault to the OR circuit 68. The OR circuit 68 provides a fault signal, based on either contingency, which may be "latched" to shut down the roll outer-loop.

Since the comparison window may be relatively large in roll it is not necessary to limit the time of comparison to a fraction of the certain pulse time. Furthermore, the 25% comparators may already be embodied in the AFCS. This accounts for the relative simplicity of the roll embodiment as compared with pitch embodiment.

It should be understood that the outer-loop monitor of this invention can be used to monitor other signals, or groups of signals, that control various functions, in an aircraft or otherwise. The teachings disclosed herein are applicable whenever it is determined that a particular sense relationship between the signals, whether it be agreement or disparity, is indicative of a fault. Practice of the invention is facilitated when some of the signals, or the signals of an entire subsystem, are digital pulses.

The invention may be practiced in automatic flight control systems having single channels of inner-loop or of outer-loop, dual channels of inner-loop or of outer-loop, or more channels of either, in various combinations. The exemplary conditions, magnitudes, durations and relationships may of course be varied to suit any particular usage of the invention and to solidify the presumption of fault based on symptomatic sense relationships between the signals, thereby enhancing the veracity of the monitor.

The foregoing description is principally in terms of function achieving blocks, and it should be understood that numerous variations may be utilized for achieving the same or equivalent functions and combinations of functions within the skill of the art. For instance, the positive logic disclosed may readily be reworked into inverting logic. The invention may be implemented in various other analog and digital forms, and may be implemented in either simplex or multiple computer systems, of a variety of architectural types, employing well known programming techniques or in a dedicated digital device.

Similarly, although the invention has been shown and described with respect to an exemplary embodiment thereof, it should be understood by those skilled in the art that the foregoing and various other changes, omissions and additions may be made therein and thereto, without departing from the spirit and scope of the invention.

What is claimed is:

1. A monitor for providing a fault signal indicative of a failure in a position control system having an inner-loop actuator positionable in response to an inner-loop error signal over a limited range of positions which is a fraction of a full range of control system positions, means for providing the inner-loop error signal as a function of the difference between the actual inner-loop actuator position and a dictated inner-loop actuator position, means for providing an outer-loop command signal, which is a pulse, when the inner-loop error signal is indicative of at least a substantial portion of the limited range of inner-loop actuator positions, and an outer-loop actuator, positionable over the full range of control system positions and connected to the inner-loop actuator for adjusting the limited range of the inner-loop actuator in response to the outer-loop command signal pulses within the full range so that the inner-loop actuator is positionable over the full range of positions, said monitor comprising:

means (46) for providing an intermediate fault signal when the sense of the outer-loop command signal (D,E) disagrees with the sense of the inner-loop error signal (A,B);

means (38) for providing a limited time signal at the onset of an outer-loop command signal pulse and for a predetermined limited time thereafter, said limited time being of duration less than that of the pulse; and means (42) for providing the fault signal (C) in response to the intermediate fault signal when the limited time signal is also present.

* * * * *